(12) United States Patent
McGeehan (10) Patent No.: US 9,128,946 B2
(45) Date of Patent: Sep. 8, 2015

(54) SYSTEMS AND METHODS FOR PLATFORM-INDEPENDENT DATA FILE TRANSFERS (75) Inventor: Thomas McGeehan, Saint Louis, MO (US)

(73) Assignee: MasterCard International Incorporated, Purchase, NY (US)

(*) Notice: Subject to any disclaimer, the term of this patent is extended or adjusted under 35 U.S.C. 154(b) by 347 days.

(21) Appl. No.: 12/143,897

(22) Filed: Jun. 23, 2008

(65) Prior Publication Data

US 2009/0171972 A1 Jul. 2, 2009

Related U.S. Application Data (60) Provisional application No. 61/017,983, filed on Dec. 31, 2007.

(51) Int. Cl.
G06F 17/30 (2006.01)
(52) U.S. Cl.
CPC ............... G06F 17/30115 (2013.01)
(58) Field of Classification Search
CPC .............. G06F 17/30005; G06F 17/30115
USPC ......................................................... 707/609
See application file for complete search history.

(56) References Cited

U.S. PATENT DOCUMENTS

| 5,291,598 | A | * | 3/1994 | Grundy | 726/28 |
| 5,375,240 | A | * | 12/1994 | Grundy | 726/28 |
| 5,694,598 | A | | 12/1997 | Durand et al. | |
| 5,732,402 | A | | 3/1998 | Lehman | |
| 5,742,810 | A | | 4/1998 | Ng et al. | |
| 5,848,415 | A | * | 12/1998 | Guck | 707/831 |
| 5,864,870 | A | * | 1/1999 | Guck | 1/1 |
| 5,999,943 | A | | 12/1999 | Nori et al. | |
| 6,012,067 | A | * | 1/2000 | Sarkar | 1/1 |
| 6,061,678 | A | * | 5/2000 | Klein et al. | 1/1 |

(Continued)

FOREIGN PATENT DOCUMENTS

| EP | 0981096 A1 | 2/2000 |
| JP | 2002-014889 * | 1/2002 |

(Continued)

OTHER PUBLICATIONS

Written Opinion of the International Searching Authority, PCT/US2008/85590; Jan. 15, 2009; 5 pages.

(Continued)

Primary Examiner — James Trujillo
Assistant Examiner — Hubert Cheung
(74) Attorney, Agent, or Firm — Armstrong Teasdale LLP (57) ABSTRACT Systems and methods for storing data files to a file system coupled to a database, and reading data files from the file system. In one aspect, a method for transferring a data file between a client system and a server system is provided. The client executes a first computer operating system and the server executes a second computer operating system, includes a file system, and is coupled to a database. The method includes receiving, by the database, a request to store the data file, wherein the request is transmitted to the database by a software application associated with the client. The method also includes receiving the data file from the client, storing the data file in a directory in the server file system, storing a path for the directory in the database, and outputting one of a success code and a failure code to the client.

30 Claims, 3 Drawing Sheets

(56) References Cited

U.S. PATENT DOCUMENTS

| | | | |
|---|---|---|---|
| 6,119,051 A * | 9/2000 | Anderson et al. | 700/221 |
| 6,226,650 B1 * | 5/2001 | Mahajan et al. | 707/625 |
| 6,256,626 B1 * | 7/2001 | Dong et al. | 1/1 |
| 6,442,571 B1 | 8/2002 | Haff | |
| 6,487,551 B2 * | 11/2002 | Dong et al. | 1/1 |
| 6,738,790 B1 * | 5/2004 | Klein et al. | 1/1 |
| 6,901,428 B1 * | 5/2005 | Frazier et al. | 709/203 |
| 7,039,651 B2 | 5/2006 | Cotner et al. | |
| 7,082,455 B2 * | 7/2006 | Hu et al. | 709/203 |
| 7,089,249 B2 * | 8/2006 | Kobayashi et al. | 1/1 |
| 7,181,511 B1 * | 2/2007 | Grenier et al. | 709/223 |
| 7,237,268 B2 * | 6/2007 | Fields | 726/27 |
| 7,254,837 B2 * | 8/2007 | Fields | 726/27 |
| 7,272,833 B2 * | 9/2007 | Yaung | 719/314 |
| 7,680,846 B2 * | 3/2010 | Shinkai | 707/999.205 |
| 7,711,703 B2 * | 5/2010 | Smolen et al. | 707/609 |
| 7,761,411 B2 * | 7/2010 | Wang et al. | 707/609 |
| 7,783,596 B2 * | 8/2010 | Smolen et al. | 707/609 |
| 7,797,276 B1 * | 9/2010 | Yang | 707/636 |
| 7,904,895 B1 * | 3/2011 | Cassapakis et al. | 717/168 |
| 2003/0135511 A1 | 7/2003 | Anderson | |
| 2003/0200256 A1 * | 10/2003 | Hu et al. | 709/203 |
| 2004/0163041 A1 * | 8/2004 | Engel | 715/509 |
| 2005/0228828 A1 * | 10/2005 | Chandrasekar et al. | 707/104.1 |
| 2006/0015945 A1 * | 1/2006 | Fields | 726/27 |
| 2006/0212495 A1 * | 9/2006 | Tokunaga et al. | 707/204 |
| 2007/0038689 A1 * | 2/2007 | Shinkai | 707/205 |
| 2007/0061487 A1 * | 3/2007 | Moore et al. | 709/246 |
| 2007/0197877 A1 * | 8/2007 | Decorte et al. | 600/300 |
| 2007/0260476 A1 * | 11/2007 | Smolen et al. | 705/1 |
| 2007/0260621 A1 * | 11/2007 | Smolen et al. | 707/100 |
| 2009/0024578 A1 * | 1/2009 | Wang et al. | 707/3 |
| 2011/0173598 A1 * | 7/2011 | Cassapakis et al. | 717/168 |

FOREIGN PATENT DOCUMENTS

| | | |
|---|---|---|
| JP | 2002014889 | 1/2002 |
| JP | 2003088302 A | 10/2003 |
| JP | 2005056085 A | 3/2005 |
| WO | 9926121 A2 | 5/1999 |
| WO | 2006009664 A1 | 1/2006 |

OTHER PUBLICATIONS

International Search Report, PCT/US 08/85590, dated Jan. 15, 2009 (2 pages).

Written Opinion re Singapore Patent Application No. 201004670-4 dated Jul. 12, 2011, 5 pages.

International Search Report and Written Opinion issued in Singapore Patent Application No. 201004670-4, mailed Jan. 19, 2012, 8 pages.

Japanese Office Action, Notice of Rejection; Application No. 2010-541469, May 21, 2013.

Japanese Non-Final Office Action Summary, Application No. 2010-541469, May 21, 2013.

Extended EP Search Report for Application No. 08866946.0 dated Sep. 27, 2013; 8 pages.

Sugawara et al., "Starting of usage of XML-DB—2nd edition—Function of storing XML data", Jan. 1, 2001, p. 131-135, vol. 16, No. 10, DB Magazine, Kabushikigaisya Syoeisha, Japan.

* cited by examiner

SYSTEMS AND METHODS FOR PLATFORM-INDEPENDENT DATA FILE TRANSFERS

CROSS REFERENCE TO RELATED APPLICATIONS

This application claims the benefit of U.S. Provisional Application No. 61/017,983 filed Dec. 31, 2007.

BACKGROUND OF THE INVENTION

This invention relates generally to systems and methods for transferring data files and, more particularly, to a system and method for performing platform-independent data file transfers within a client-server network.

During operation of a client-server network, it is often desirable to transfer data files between network nodes, such as clients and/or servers. In at least some such networks, a database, or a server having a database, may store an entire data file within a database table for a particular record. For example, a database may include a table that holds, for each record, a record identifier and a data file associated with the identified record. As the number of records grows, however, the database size increases quickly due to the additional data files. This may greatly impact the speed in which queries are processed within the database, as well as the speed of adding new records to the database.

Moreover, at least some databases may store entire data files of binary data, such as images, audio, and/or other multimedia objects, as Binary Large Objects (BLOBs). For example, a database may include a table that holds, for each record, a record identifier and a BLOB associated with the identified record. Such a database is subject to the same performance issues described above. Accordingly, a system that enables data file transfer into and out of a database, independent of the operating system transferring the data file, is needed.

BRIEF DESCRIPTION OF THE INVENTION

In one aspect, a method for transferring a data file between a client system and a server system is provided. The client executes a first computer operating system and the server executes a second computer operating system, includes a file system, and is coupled to a database. The method includes receiving, by the database, a request to store the data file, wherein the request is transmitted to the database by a software application associated with the client. The method also includes receiving the data file from the client, storing the data file in a directory in the server file system, storing a path for the directory in the database, and outputting one of a success code and a failure code to the client.

In another aspect, a network-based system for performing platform independent data file transfers is provided. The system includes a plurality of client systems including a first client and a second client, wherein the first client executes a first computer operating system and is associated with a software application written in a first programming language, and the second client executes a second computer operating system and is associated with a software application written in a second programming language. The system also includes a server system including a file system and a database, wherein the server executes a third computer operating system. The server is configured to be coupled to the clients, and is further configured to receive, from the first client, a request to store a data file, receive the data file from the first client, store the data file in a directory in the server file system, store a path for the directory in the database, and output one of a success code and a failure code to the first client.

In another aspect, a computer coupled to a database for performing platform independent data file transfers is provided. The computer includes a file system and is in communication with a client, wherein the client executes a first computer operating system and the computer executes a second computer operating system. The computer is programmed to receive, from the client, a request to store a data file, receive the data file from the client, store the data file in a directory in the file system, store a path for the directory in the database, and output one of a success code and a failure code to the client.

In yet another aspect, a computer program embodied on a computer readable medium for performing platform independent data file transfers between a client system and a server system is provided. The server system includes a file system and is coupled to a database. The client executes a first computer operating system and the server operates a second computer operating system. The program includes at least one code segment that receives a request to store a data file, the request transmitted by a software application associated with the client, receives the data file from the client, stores the data file in a directory in the server file system, stores a path for the directory in the database, and outputs one of a success code and a failure code to the client.

DETAILED DESCRIPTION OF THE INVENTION

As used herein, a processor may include any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

As used herein, a database may include any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a Character Large Object (CLOB) is a collection of character data, such as text, that may be stored in a database system. The CLOB variable type may include a relatively large amount of data. For example, a CLOB may include up to approximately 2 gigabytes (GB) of data.

Described in detail herein are exemplary embodiments of systems and methods that facilitate performing platform-independent data file transfers within a client-server network using a database. The systems and methods facilitate, for example, storing a data file in a file system of a server that is coupled to the database, and storing a path of the data file in the database. Moreover, the systems and methods facilitate reading the data file from the file system by initially querying the database for the file system path of the data file, and then reading the data file from the file system according to the returned path. As a result, the systems and methods described herein enable a software application written in any programming language to write data files to, and read data files from, a file system of a server that is coupled to a database, regardless of the operating system of the client and regardless of the operating system of the server.

Technical effects of the systems and methods described herein include at least one of (a) creating a plurality of directories in a file system of a server coupled to a database, wherein the server uses, or executes, any operating system; (b) receiving a data file from a client, wherein the client uses any operating system and transmits the data file using a client software application that is written in any programming language; (c) storing the data file in a memory of the server; (d) declaring a CLOB variable; (e) sequentially reading each line of the data file from the server memory into the CLOB variable; (f) copying each line from the CLOB variable to a directory in the server file system; and (g) storing a path for the directory in the database. Additional technical effects of the systems and methods described herein include at least one of (g) receiving a request from the client to retrieve a stored data file; (h) declaring a CLOB variable; (i) sequentially reading each line of the data file from the directory into the CLOB variable; (j) copying each line from the CLOB variable to the server memory; and (k) transmitting the data file to the client.

In one embodiment, a computer program is provided. The computer program is embodied on a computer readable medium and utilizes a Structured Query Language (SQL) for communications between an end user device, such as a client system using, or executing, any operating system, and a server system using any operating system and coupled to communicate with a database. In one embodiment, such a system is used within a business-entity intranet, such as a payment transaction network. In an alternative embodiment, such a system is used within a combination of one or more business-entity intranets as well as on the Internet.

The systems and methods described herein are not limited to the specific embodiments described herein. For example, components of each system and/or steps of each method may be used and/or practiced independent and separately from other components and/or steps described herein. In addition, each component and/or step may also be used and/or practiced with other assembly packages and methods.

Figure 1:
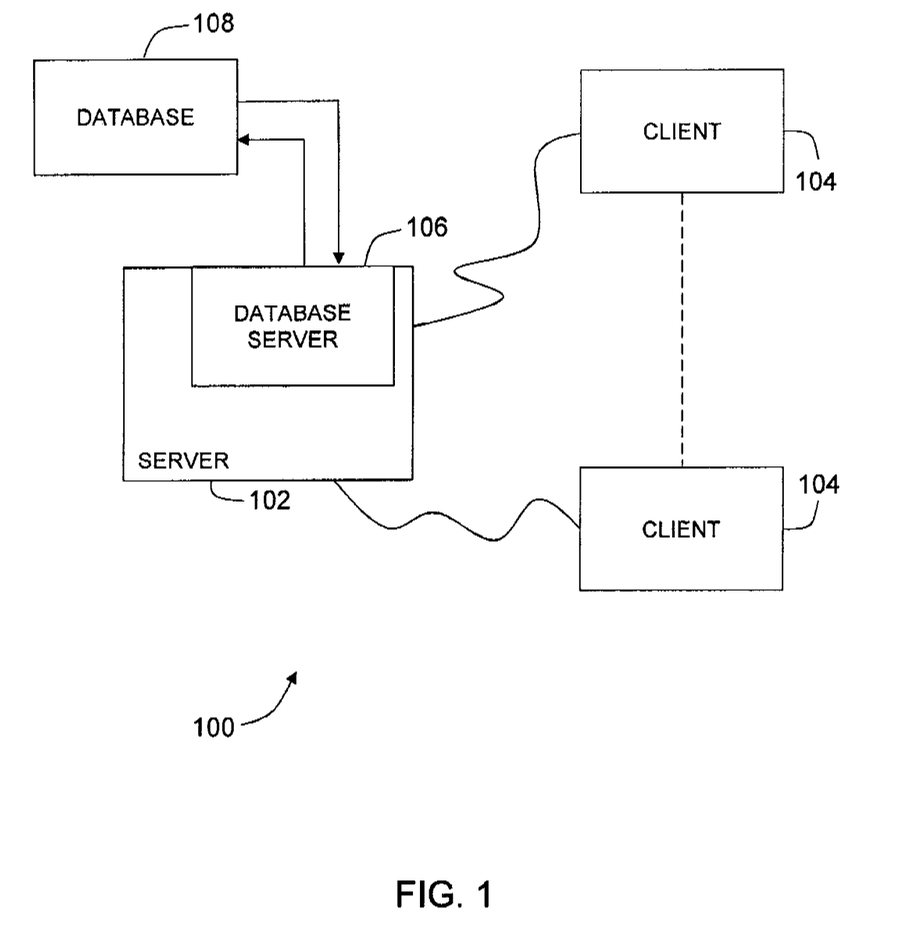
FIG. 1 is a simplified block diagram of an exemplary embodiment of an architecture of a system in accordance with one embodiment of the present invention.

FIG. 1 is a simplified block diagram of an exemplary system 100 in accordance with one embodiment of the present invention. In one embodiment, system 100 is a financial transaction card payment system. More specifically, in the exemplary embodiment, system 100 includes a server system 102, and a plurality of client sub-systems, also referred to as client systems 104, connected to server system 102. In one embodiment, client systems 104 are computers including a web browser and/or a client software application, such that server system 102 is accessible to client systems 104 over a network, such as the Internet and/or an intranet. Client systems 104 are interconnected to the Internet through many interfaces including a network, such as a local area network (LAN), a wide area network (WAN), dial-in-connections, cable modems, wireless modems, and/or special high-speed ISDN lines. Client systems 104 could be any device capable of interconnecting to the Internet including a web-based phone, personal digital assistant (PDA), or other web-based connectable equipment. A database server 106 is connected to a database 108 containing information on a variety of matters, such as financial transaction card payment data. In one embodiment, centralized database 108 is stored on server system 102 and is accessed by potential users at one of client systems 104 by logging onto server system 102 through one of client systems 104. In an alternative embodiment, database 108 is stored remotely from server system 102 and may be non-centralized.

Figure 2:
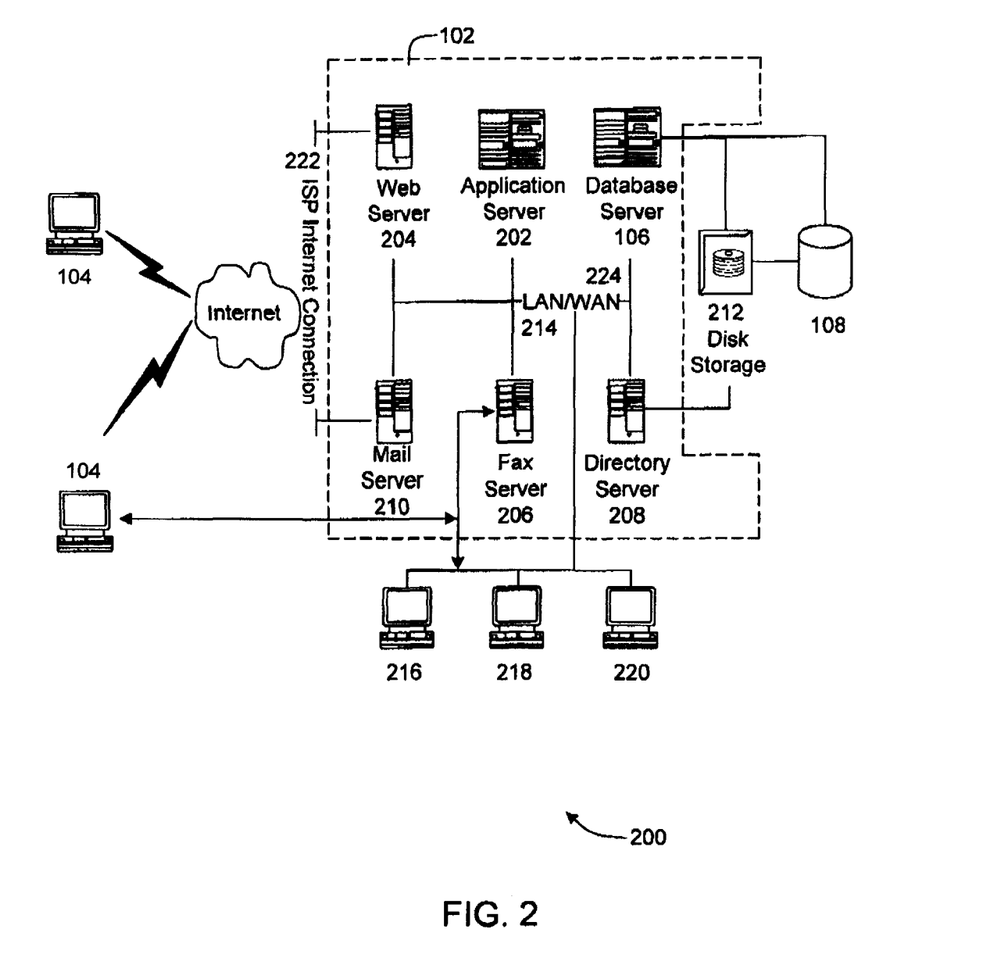
FIG. 2 is an expanded block diagram of an exemplary embodiment of an architecture of a system in accordance with one embodiment of the present invention

FIG. 2 is an expanded block diagram of an exemplary embodiment of a server architecture of a system 200 in accordance with one embodiment of the present invention. Components in system 200, identical to components of system 100 (shown in FIG. 1), are identified in FIG. 2 using the same reference numerals as used in FIG. 1. System 200 includes server system 102 and client systems 104. Server system 102 further includes database server 106, an application server 202, a web server 204, a fax server 206, a directory server 208, and a mail server 210. A disk storage unit 212 is coupled to database server 106 and directory server 208, Examples of disk storage unit 212 include, but are not limited to including, a Network Attached Storage (NAS) device and a Storage Area Network (SAN) device. Database server 106 is also coupled to database 108. Servers 106, 202, 204, 206, 208, and 210 are coupled in a local area network (LAN) 214. In addition, a system administrator's workstation 216, a user workstation 218, and a supervisor's workstation 220 are coupled to LAN 214. Alternatively, workstations 216, 218, and 220 are coupled to LAN 214 using an Internet link or are connected through an intranet.

Each of client systems 104 and workstations 216, 218, and 220 is a personal computer having a web browser and/or a client application. Although the functions performed at client systems 104 and workstations 216, 218, and 220 are typically illustrated as being performed at respective client systems 104 and/or workstations 216, 218, and 220, such functions may instead be performed at one of many personal computers coupled to LAN 214. Client systems 104 and workstations 216, 218, and 220 are illustrated as being associated with separate functions only to facilitate an understanding of the different types of functions that can be performed by individuals having access to LAN 214.

Server system 102 is configured to be communicatively coupled to client systems 104 and workstations 216, 218, and 220 to enable server system 102 to be accessed using an ISP Internet connection 222. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 224, local area network 214 could be used in place of WAN 224. Furthermore, fax server 206 communicates with remotely located client systems 104 and workstations 216, 218, and 220 using a telephone link.

In the exemplary embodiment, client systems 104 may use, or execute, any of a plurality of computer operating systems.

Examples of possible computer operating systems include, but are not limited to only including, Microsoft® Windows, Mac OS X®, and LINUX® distribution, such as Canonical Ltd. Ubuntu®, Novell® SUSE LINUX®, and Debian®. (Microsoft is a registered trademark of Microsoft Corporation, Redmond, Washington; Mac OS X is a registered trademark of Apple, Inc., Cupertino, California; Canonical Ltd. Ubuntu is a registered trademark of Canonical Ltd., Isle of Mann; Novell is a registered trademark of Novell, Inc., Waltham, Massachusetts; and Debian is a registered trademark of Software in the Public Interest, Inc., Indianapolis, Ind.; LINUX® is the registered trademark of Linus Torvalvs in the U.S. and other countries.) However, any computer operating system may be used that enables client systems 104 to function as described herein. Each client system 104 interacts with server system 102 and/or accesses database 108 through database server 106 using a client application. In the exemplary embodiment, the client software application may be written in any of a plurality of programming languages. Examples of possible programming languages include, but are not limited to only including, C#, C++, Java, and/or Perl. However, any programming language may be used that enables the software application used by client systems 104 to function as described herein.

Moreover, in the exemplary embodiment, database server 106 may use, or execute, any of a plurality of computer operating systems. Examples of possible computer operating systems include, but are not limited to only including, Microsoft® Windows Server 2003, FreeBSD®, UNIX®, and a LINUX® distribution, such as those discussed above. (Microsoft is a registered trademark of Microsoft Corporation, Redmond, Washington; FreeBSD is a registered trademark of The FreeBSD Foundation, Boulder, Colorado; and UNIX is a registered trademark of The Open Group, San Francisco, California.) However, any computer operating system may be used that enables database server 106 to function as described herein. Further, any server communicatively coupled to database 108, such as directory server 208, for example, may use, or run, any of the plurality of computer operating systems discussed above.

Figure 3:
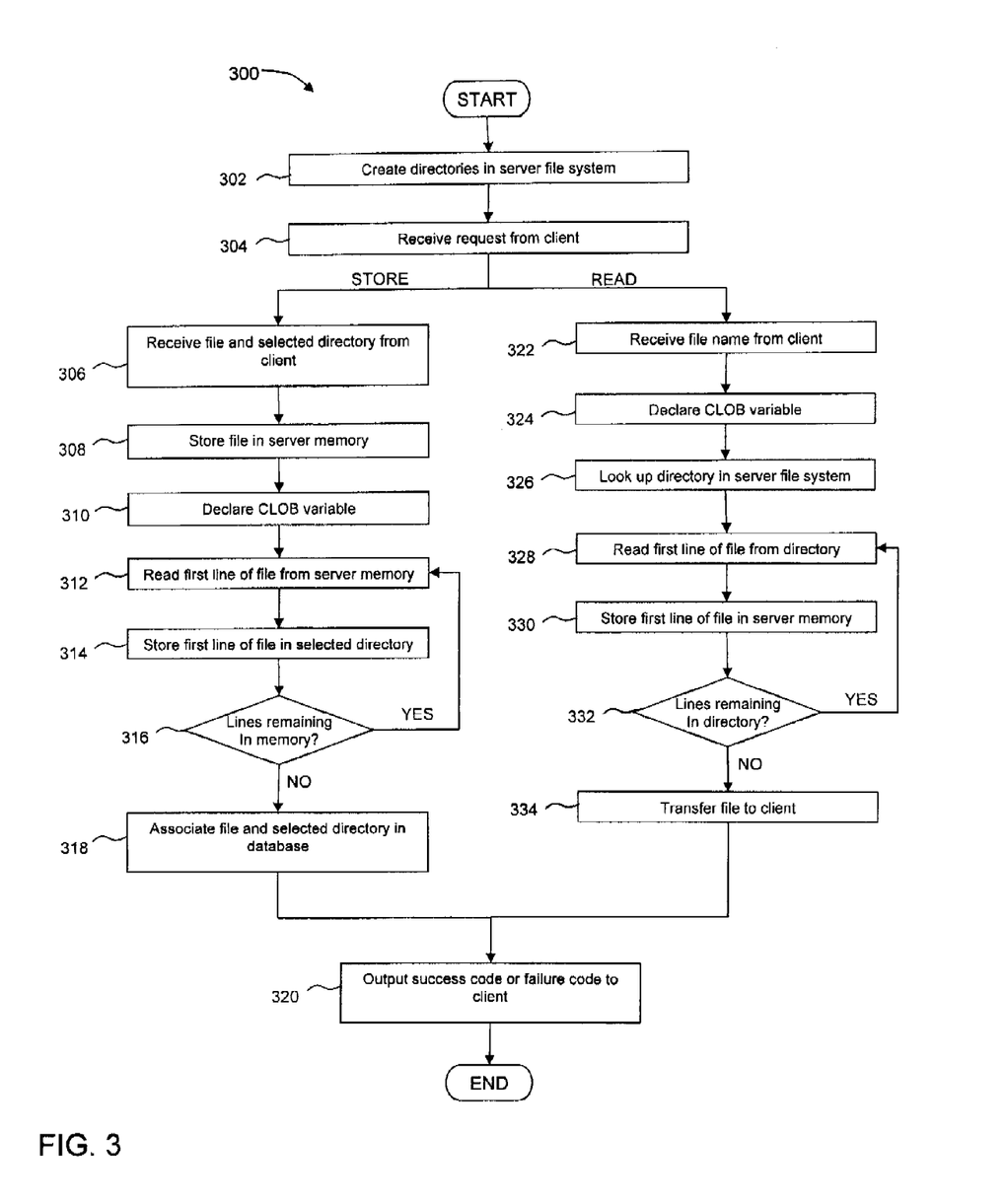
FIG. 3 is a flow chart illustrating an exemplary method utilized by the system shown in FIG. 2.

FIG. 3 is a flowchart illustrating an exemplary method 300 utilized by system 200 (shown in FIG. 2). In the exemplary embodiment, in order to transfer data files within system 200, a plurality of directories must be created 302. Each directory is created in a file system of a server coupled to database 108 (shown in FIG. 2), such as database server 106 (shown in FIG. 2). In an alternative embodiment, directories may be created on any server within server system 102 (shown in FIG. 2) having a file system accessible by database 108. A plurality of directory types and directory names are also created within database 108. In one embodiment, SQL commands are used to instruct database 108 to create the directory types and to associate directory names with the directory types.

After directories have been created within a file system and associated with directory types in database 108, client system 104 (shown in FIG. 2) may request, through the client application, that a data file be stored or read. Database server 106 receives 304 the request and determines whether the request is a store request or a read request.

In the exemplary embodiment, and when the request is a store request, database server 106 receives 306 the data file and a directory from client system 104. In an alternative embodiment, and when the directory is not received from client system 104, database server 106 selects a default directory. Database 108 then stores 308 the data file into a memory (not shown) of a server, such as database server 106 or directory server 208 (shown in FIG. 2). The server memory may include Random Access Memory (RAM) modules and/or a swap space that has been created in the server file system. Database 108 declares 310 a Character Large Object (CLOB) variable, which is used to copy data from the data file stored in the server memory to the destination directory. Database 108 then reads 312 a first line of characters from the server memory. More specifically, database 108 sets the CLOB variable equal to the first line of characters. In the exemplary embodiment, database 108 then opens the directory, which was created as described above, and stores 314 the CLOB variable value into the directory. Alternatively, if the directory has not already been created, database 108 creates 302 the directory as described above. Database 108 then determines 316 whether there are remaining lines of characters in the data file stored in the server memory. The end of the data file may be represented by a flag, such as an End Of File (EOF) flag. If there are lines of characters remaining in the data file, database 108 repeats the steps of reading 312 the next line of characters from the server memory, setting the CLOB variable equal to the next line of characters, and storing 314 the CLOB variable value into the directory. Database 108 then stores 318 a path of the directory and/or the file name in a particular database table. The database table includes multiple columns of data and/or identifiers, such as a first column that includes an identifier for each database record and a second column that includes the path of the directory to which the data file has been stored. When the data file has been stored, database 108 outputs 320 to client system 104 one of a success code and a failure code. The success code or failure code may be displayed to a user via an audible signal and/or a visual signal on a client display.

In the exemplary embodiment, and when the request is a read request, database server 106 receives 322 the file name and/or an associated database record from client system 104. Database 108 declares 324 a Character Large Object (CLOB) variable, and searches 326 for the directory of the server file system associated with the data file. Database 108 may search a table, such as a table described above for storing the directory paths and associated record identifiers, using an identifier for the database record associated with the data file being requested. Database 108 opens the data file within the directory and reads 328 the first line of the data file. Database 108 sets the CLOB variable to equal the first line of the data file. The CLOB variable value is then stored 330 in the server memory. Database 108 then determines 332 whether there are remaining lines of characters in the data file stored in the directory. The end of the data file may be represented by a flag, such as an End Of File (EOF) flag. If there are lines of characters remaining in the directory, database 108 repeats the steps of reading 328 the next line of characters from the directory, setting the CLOB variable equal to the next line of characters, and storing 330 the CLOB variable value into the server memory. The data file is then transferred 334 to client system 104. When the data file has been transferred, database 108 outputs 320 to client system 104 one of a success code and a failure code. The success code or failure code may be displayed to a user via an audible signal and/or a visual signal on a client display. Alternatively, the data file may be displayed to the user of client system 104 using the client display.

The systems and methods described herein facilitate performing platform-independent data file transfers in a client-server network that includes a database. Moreover, the systems and methods enable a software application written in any programming language, and run by a client using any computer operating system, to write data files to and read data files from a file system of a server that is coupled to a database, regardless of the computer operating system used by the server.

Although the systems and methods described herein are described in the context of platform-independent data file transfers using a database, it is understood that the systems and methods are not limited to only such systems and/or methods. Likewise, the system components illustrated are not limited to the specific embodiments herein, but rather, components of the system may be utilized independently and separately from other components described herein.

While the invention has been described in terms of various specific embodiments, those skilled in the art will recognize that the invention can be practiced with modification within the spirit and scope of the claims.

What is claimed is:

1. A method for transferring a data file between a client system and a server system, the server system having a file system, a database system, and a memory component, wherein the database system includes a database and provides the client system with access to the file system, wherein the client system executes a first computer operating system and the server system executes a second computer operating system, the method comprising:
   receiving, by the database system, a request to store the data file, the request transmitted by a software application associated with the client system;
   receiving, by the database system, the data file from the client system;
   using the database system to store the data file in the memory component within the server system;
   transferring the data file from the memory component within the server system to a destination directory included within the server file system, including declaring a Character Large Object (CLOB) variable and reading a first line of characters of the data file from the memory component;
   storing within the database a directory path to the destination directory, the directory path providing a record of the destination directory within the server file system in which the data file has been stored; and
   using the database system to output a success code to the client system if the data file is successfully stored in the destination directory, the success code indicates that the data file was successfully stored in the destination directory.

2. The method in accordance with claim 1 further comprising creating a plurality of directories within the server file system, wherein the directory in which the data file is stored is one of a selected directory and a default directory.

3. The method in accordance with claim 1 wherein the data file includes a plurality of character lines, storing the data file in the destination directory included within the server file system further comprises sequentially storing each line of the plurality of character lines into the directory by:
   setting the CLOB variable equal to the first line of characters;
   copying the CLOB variable contents into the directory; and
   determining whether the data file contains additional lines.

4. The method in accordance with claim 1 wherein the server system comprises a first server and a second server, and wherein storing the data file in the memory within the server system comprises storing the data file in a temporary memory included within the first server.

5. The method in accordance with claim 4 wherein copying the data file into a destination directory comprises transmitting the received data file from the first server to the second server and storing the received data file in a memory of the second server.

6. The method in accordance with claim 4 further comprising:
   receiving, by the database system, a request to transmit the data file to the client system;
   searching for the destination directory included within the server file system associated with the data file;
   opening the data file within the destination directory;
   transmitting data from the data file into the memory component of the first server;
   storing the data from the data file in the memory of the first server; and
   transmitting the data file from the first server to the client system.

7. The method in accordance with claim 6 wherein the data file includes a plurality of character lines, and wherein storing data from the data file in the memory component of the first server comprises sequentially storing each line of the plurality of character lines into the memory component by:
   accessing the data file stored in the destination directory;
   declaring a Character Large Object (CLOB) variable;
   setting the CLOB variable equal to each line;
   copying the CLOB variable contents into the memory component; and
   determining whether the data file contains additional lines.

8. The method in accordance with claim 6 wherein the client system is a first client system of a plurality of client systems, and wherein transmitting the data file from the first server to the client system comprises transmitting the data file to a second client system of the plurality of client systems, wherein the second client system executes a third computer operating system that is different than the first computer operating system executed by the first client system.

9. The method in accordance with claim 8 wherein transmitting the data file to a second client system comprises transmitting the data file to the second client system, wherein the second client is associated with a software application that is written in a different programming language than the language of the software application associated with the first client system.

10. The method in accordance with claim 6 further comprising:
   receiving, by the database system, an identifier associated with the request to transmit the data file; and
   retrieving from the database system the destination directory of the data file using at least the identifier.

11. The method in accordance with claim 4 wherein the second computer operating system executed by at least one of the first server and the second server is different than the first computer operating system executed by the client system.

12. The method in accordance with claim 1 wherein receiving, by the database system, the data file from the client system comprises receiving at least one of an image file, an audio file, and a multimedia file.

13. The network-based system in accordance with claim 12 wherein the database system is further configured to:
   store the received data file in the memory component of the first server;
   transmit the received data file from the first server to the second server; and
   store the data file in the destination directory within the file system of the second server using the CLOB variable.

14. The network-based system in accordance with claim 13 wherein the database system is further configured to:

receive a request to transmit the data file to a client of the plurality of clients;

access the data file stored in the destination directory within the second server;

declare a Character Large Object (CLOB) variable in the database;

set the CLOB variable equal to each line;

copy the CLOB variable contents into the memory component of the first server;

determine whether the data file contains additional lines; and transmit the data file to the client from the memory component.

15. The method in accordance with claim 1 wherein the database system includes a table, the table including a column for storing directory paths, wherein storing within the database a directory path to the destination directory further comprises storing the directory path within the table.

16. A network-based system for performing platform independent data file transfers, the system comprising:
a plurality of client systems comprising a first client and a second client, wherein the first client executes a first computer operating system and is associated with a software application written in a first programming language, the second client executes a second computer operating system and is associated with a software application written in a second programming language; and
a server system comprising a file system, a memory component, and a database system, the server system executes a third computer operating system and is configured to be coupled to the plurality of clients, the database system including a database and configured to provide the plurality of clients with access to the file system, the database system configured to:
receive, from the first client, a request to store a data file;
receive the data file from the first client;
store the data file in the memory component;
transfer the data file from the memory component within the server system to a destination directory included within the server file system, wherein the database system is further configured to declare a Character Large Object (CLOB) variable and read a first line of characters of the data file from the memory component;
store within the database a path for the destination directory, the directory path providing a record of the destination directory within the server file system in which the data file has been stored; and
output a success code to the first client if the data file is successfully stored in the destination directory, the success code indicating that the data file was successfully stored in the destination directory.

17. The network-based system in accordance with claim 16 wherein the database is further configured to create a plurality of directories within the file system, wherein the directory in which the data file is stored is one of a selected directory and a default directory.

18. The network-based system in accordance with claim 16 wherein the data file includes a plurality of character lines, the database system is further configured to:
set the CLOB variable equal to the first line of characters;
copy the CLOB variable contents into the destination directory; and
determine whether the data file contains additional lines.

19. The network-based system in accordance with claim 16 wherein the first computer operating system executed by the first client is different than at least one of the computer operating system executed by the second client and the third operating system executed by the server system.

20. The network-based system in accordance with claim 16 wherein the first programming language used to write the software application associated with the first client is different than the second programming language used to write the software application associated with the second client.

21. The network-based system in accordance with claim 16 wherein the server system comprises a first server and a second server, and wherein the memory component is included within the first server and the file system is included within the second server.

22. A computer coupled to a database system for performing platform independent data file transfers, the computer comprising a file system and a memory component, the computer in communication with a client, wherein the client executes a first computer operating system and the computer executes a second computer operating system, the database system comprising a database and configured to:
receive, from the client, a request to store a data file;
receive the data file from the client;
store the data file in the memory component;
transfer the data file from the memory component within the server system to a destination directory included within the server file system, wherein the database is further configured to declare a Character Large Object (CLOB) variable and read a first line of characters of the data file from the memory component;
store within the database a directory path to the destination directory, the directory path providing a record of the destination directory within the file system in which the data file has been stored; and
output a success code to the client if the data file is successfully stored in the destination directory, the success code indicating that the data file was successfully stored in the destination directory.

23. The computer in accordance with claim 22 wherein the database system is further configured to:
set the CLOB variable equal to the first line of characters in the data file stored in the memory component;
copy the CLOB variable contents into the destination directory; and
determine whether the data file contains additional lines.

24. The computer in accordance with claim 22 wherein the database system is further configured to:
receive a request to transmit the data file to the client;
access the data file stored in the destination directory;
declare a Character Large Object (CLOB) variable in the database;
set the CLOB variable equal to each line;
copy the CLOB variable contents into the memory component of the computer;
determine whether the data file contains additional lines; and
transmit the data file to the client from the memory component.

25. The computer in accordance with claim 24 wherein the client is a first client of a plurality of client systems, the computer is configured to transmit the data file to a second client of the plurality of client systems, wherein the first client executes the first computer operating system that is different from the second computer operating system executed by the computer, and wherein the second client executes a third operating system.

26. A non-transitory computer readable storage medium storing computer-executable instructions thereon for performing platform independent data file transfers between a client system and a server system that includes a file system, a database system, and a memory component, the database system including a database and configured to provide the client system with access to the file system, wherein the client system executes a first computer operating system and the server system operates a second computer operating system, wherein when executed by the server system, the computer-executable instructions cause the server system to cause the database system to:
- receive a request to store a data file, the request transmitted by a software application associated with the client system;
- receive the data file from the client system;
- store the data file in the memory component within the server system;
- transfer the data file from the memory component within the server system to a destination directory included within the server file system, wherein the computer-executable instructions further cause the server system to cause the database system to declare a Character Large Object (CLOB) variable and read a first line of characters of the data file from the memory component;
- store a directory path for the destination directory, the directory path providing a record of the destination directory within the server file system in which the data file has been stored; and
- output a success code to the client system if the data file is successfully stored in the destination directory, the success code indicating that the data file was successfully stored in the destination directory.

27. The non-transitory computer readable storage medium in accordance with claim 26 wherein said computer-executable instructions further cause the server system to cause the database system to:
- store the data file in a memory of the server;
- set the CLOB variable equal to a first line of characters in the data file stored in the memory component;
- copy the CLOB variable contents into the destination directory; and
- determine whether the data file contains additional lines.

28. The non-transitory computer readable storage medium in accordance with claim 26 wherein said computer-executable instructions further cause the server system to cause the database system to:
- receive a request to transmit the data file to the client system;
- access the data file stored in the destination directory;
- declare a Character Large Object (CLOB) variable;
- set the CLOB variable equal to each line;
- copy the CLOB variable contents into the memory component of the server system;
- determine whether the data file contains additional lines; and
- transmit the data file to the client from the memory component.

29. The non-transitory computer readable storage medium in accordance with claim 26 wherein the client system includes a first client of a plurality of clients, wherein said computer-executable instructions further cause the server system to cause the database system to transmit the data file to a second client of the plurality of clients, wherein the first client executes the first computer operating system that is different from the second computer operating system executed by the server, and wherein the second client executes a third operating system.

30. A method for transferring a data file between a client system and a server system, the server system having a file system, a database system, and a memory component, wherein the database system includes a database and provides the client system with access to the file system, wherein the client system executes a first computer operating system and the server system executes a second computer operating system, the method comprising:
- receiving, by the database system, a request to store the data file, the request transmitted by a software application associated with the client system;
- receiving, by the database system, the data file from the client system;
- using the database system to store the data file in the memory component within the server system;
- transferring the data file from the memory component within the server system to a destination directory included within the server file system, including declaring a Character Large Object (CLOB) variable and reading a first line of characters of the data file from the memory component;
- storing within the database a destination directory path and a file name, the destination directory path and the file name providing a record of a location within the server file system in which the data file has been stored; and
- using the database system to output a success code to the client system if the data file is successfully stored in the destination directory, the success code indicates that the data file was successfully stored in the destination directory.

* * * * *